L. B. Bradley,
Jaw Trap.
N° 12,892.   Patented May 22, 1855.
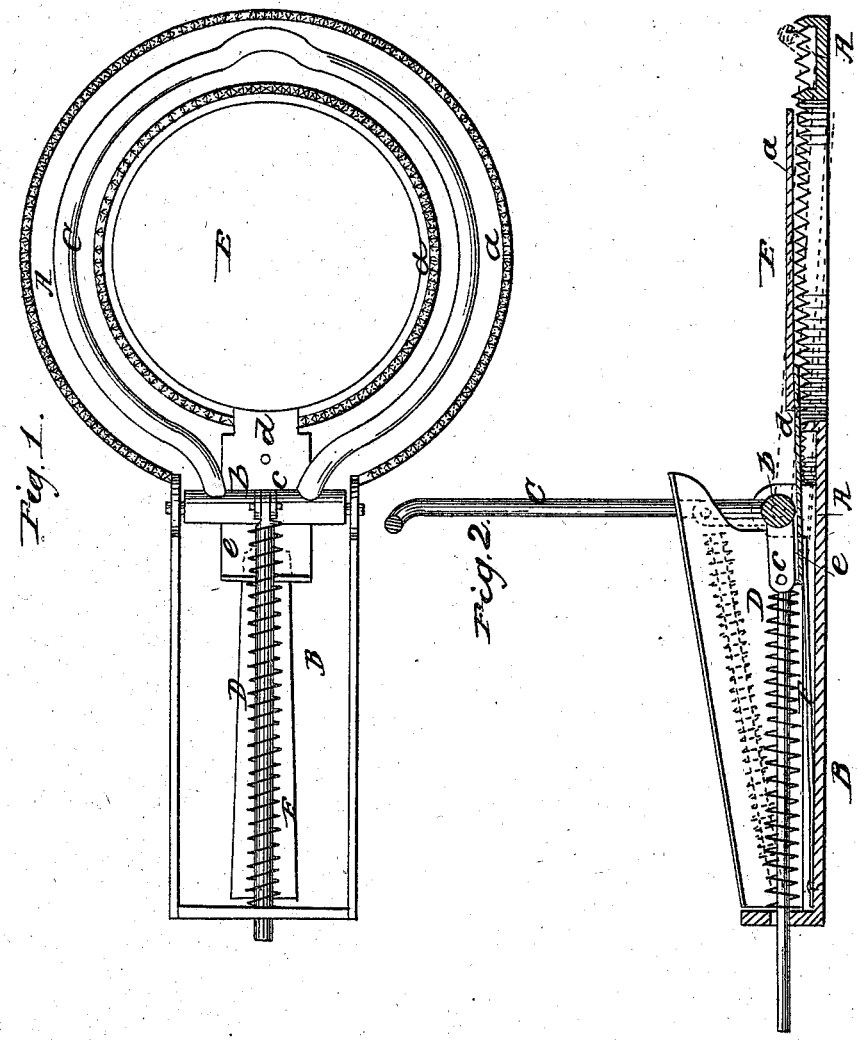

UNITED STATES PATENT OFFICE.

LUCIUS B. BRADLEY, OF WATERTOWN, CONNECTICUT.

RAT-TRAP.

Specification of Letters Patent No. 12,892, dated May 22, 1855.

*To all whom it may concern:*

Be it known that I, LUCIUS B. BRADLEY, of Watertown, in the county of Litchfield and State of Connecticut, have invented a new and useful Improvement in Rat-Traps; and I do hereby declare that the following is a full, clear, and exact description of the same, reference being had to the accompanying drawings, forming part of this specification, in which,—

Figure 1, is a plan or top view of the trap, not set. Fig. 2, is a vertical longitudinal section of the same, set; the red lines in this view show it as it appears after being unset.

Similar letters of reference indicate corresponding parts in the two figures.

My invention relates to an improvement in that description of rat trap which employs a spring fall or drop which is so combined with a trigger that when the rat lays hold of the bait and pulls hard it is caused to come down with great force and kill or confine him securely.

The nature of said improvement consists in the employment of a tilting or swinging plate and a balancing or counteracting spring, in combination with the ordinary spring drop or fall, for the purpose of always insuring the action of the trap, the moment the rat comes upon the tilting bottom to eat the savory morsel.

To enable others to fully understand my invention, I will proceed to describe it minutely.

A, represents the base of the trap consisting of a cast iron annular rimmed plate, having an arm B, on its rear side. The rims $a$, $a$, of this plate are serrated like a saw as shown.

C, is the ordinary spring drop or fall, which serves in connection with the serrated rims $a$, $a$, of the base A, for confining the rat, made of ring form and turning on a fulcrum at $b$, and rendered elastic or capable of exerting power by means of a spring D, which is attached to the rear of the arm B, and to a stop $c$, on the top of the fulcrum $b$, of the drop or fall, as shown.

E, is the hinged tilting plate upon which the bait is placed and by which the trap is unset through the weight of the rat as he approaches the bait. This tilting plate is hinged at $d$, and has an arm $e$, formed on it which extends back a short distance from $d$.

F, is a spring arranged on the upper side of the arm B; the forward end of this spring passes under and acts forcibly against the extension $e$, of the tilting plate and causes it to exert power against the stop $c$, of the drop or fall when the trap is set as shown in Fig. 2, and thereby almost entirely counteract the power of the spring D, while the trap is set, or the fulcrum $b$, on the center, and thus avoid the serious difficulty heretofore experienced from the rat not being able by his weight to unset the trap. It should be observed that the spring F, does not interfere with the action of the spring D, but rather serves for giving additional force to the drop.

Operation: The bait being placed on the tilting plate the trap is set as shown in black. A rat passes upon the tilting plate and by his weight depresses it, in doing which he throws up the arm $e$, of the tilting plate and thereby, through the agency of the balancing or counteracting spring F, throws the stop $e$, and fulcrum off the center and thus enables spring D, to act and force the drop or fall down upon the rat or to the position shown in red in Fig. 2, and kill or confine him securely.

What I claim as my invention and desire to secure by Letters Patent, is,

The employment of a tilting or swinging plate E, and balancing or counteracting spring F, in combination with the ordinary spring drop or fall C, substantially as and for the purposes set forth.

LUCIUS B. BRADLEY.

Witnesses:
R. S. BEERS,
C. B. KING.